United States Patent
Chen

(10) Patent No.: US 11,400,552 B2
(45) Date of Patent: Aug. 2, 2022

(54) RESIDUAL MATERIAL SEPARATION DEVICE

(71) Applicants: HKC CORPORATION LIMITED, Shenzhen (CN); CHONGQING HKC OPTOELECTRONICS TECHNOLOGY CO.,LTD., Chongqing (CN)

(72) Inventor: Qigui Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 190 days.

(21) Appl. No.: 16/312,492

(22) PCT Filed: Nov. 23, 2018

(86) PCT No.: PCT/CN2018/117109
§ 371 (c)(1),
(2) Date: Nov. 11, 2019

(87) PCT Pub. No.: WO2019/242228
PCT Pub. Date: Dec. 26, 2019

(65) Prior Publication Data
US 2020/0094362 A1    Mar. 26, 2020

(30) Foreign Application Priority Data
Jun. 20, 2018   (CN) .......................... 201820955525.4

(51) Int. Cl.
*B23Q 3/00* (2006.01)
(52) U.S. Cl.
CPC ..................................... *B23Q 3/00* (2013.01)

(58) Field of Classification Search
CPC ........... B25B 11/00; B25B 11/02; B23Q 3/00; B23Q 3/06; B23Q 3/069; B23Q 3/154; B26D 7/18; G02F 1/1333; C03B 33/02
(Continued)

(56) References Cited

U.S. PATENT DOCUMENTS

2008/0311817 A1    12/2008  Kawamoto
2016/0271785 A1*    9/2016  Hayes .................... A46B 5/021

FOREIGN PATENT DOCUMENTS

CN        101059615 A    10/2007
CN        101604089 A    12/2009
(Continued)

OTHER PUBLICATIONS

CN-101825780-A Machine Translation (Year: 2010).*
CN-106738359-A Machine Translation (Year: 2017).*
Yan Chen, the ISA written comments, Mar. 2019, CN.

*Primary Examiner* — Lee D Wilson
*Assistant Examiner* — Alberto Saenz

(57) ABSTRACT

A residual material separation device, including: a loading platform, configured to support a display panel that includes a substrate layer, a circuit layer, and residual material at a lateral side of the circuit layer, where the loading platform is used to contact the circuit layer of the display panel and avoid the residual material; a fixing portion, configured to contact the substrate layer of the display panel to fix the display panel to the loading platform; and a pressing portion disposed in proximity to a side of the loading platform to apply a pressing force to a part of the substrate layer adjacent to the residual material, where the residual material is allowed to be separated from the display panel under the action of the pressing force and freely fall off.

17 Claims, 2 Drawing Sheets

(58) Field of Classification Search
USPC .................................. 269/13, 43, 45, 156
See application file for complete search history.

(56) References Cited

FOREIGN PATENT DOCUMENTS

| | | | | |
|---|---|---|---|---|
| CN | 101770105 A | | 7/2010 | |
| CN | 101825780 A | * | 9/2010 | |
| CN | 101825780 A | | 9/2010 | |
| CN | 104386906 A | | 3/2015 | |
| CN | 106738359 A | * | 5/2017 | ........... B23D 31/002 |
| CN | 106738359 A | | 5/2017 | |

* cited by examiner

RESIDUAL MATERIAL SEPARATION DEVICE

CROSS-REFERENCE TO RELATED APPLICATIONS

This application is the International Application No. PCT/CN2018/117109 for entry into US national phase, with an international filing date of Nov. 23, 2018 designating the U.S., and claims priority to Chinese Patent Application No.201820955525.4, filed on Jun. 20, 2018, the contents of which is incorporated herein by reference.

FIELD

The present application relates to the technical field of mechanical automation, and more particularly to a residual material separation device.

BACKGROUND

With the continuous development of mechanical automation technology, mechanical apparatus has gradually replaced traditional manual labor and played a huge role in automated production. In the field of display panels, a cutting apparatus is a common automated device, in which, a substrate is cut into a small-sized stick, then the stick is cut into a display panel, and finally a residual material located at an end of a circuit layer of the display panel is manually removed such that the residual material is separated from the display panel and falling off, thereby the entire cutting process is completed.

However, in practical applications, when the residual material is manually separated, the force, angle, and position of the human hand cannot be precisely controlled, so that some of the residual material cannot be effectively separated, and it is easy to scratch the end of the circuit layer, thereby causing the entire display panel is scrapped, and manual separation of the residual material can also seriously damage the worker's fingers, the efficiency is low and labor costs is high.

SUMMARY

An object of the present application is to provide a residual material separation device, including but not limited to solve the technical problem that the work efficiency is low and the finger is easy to be damaged by manual separation of the residual material.

In order to solve the above technical problem, the technical solution adopted by the embodiment of the present application is that a residual material separation device includes:

a loading platform, configured to support a display panel, the display panel including a substrate layer, a circuit layer, and residual material at a lateral side of the circuit layer, the loading platform is configured to contact with the circuit layer of the display panel and to avoid the residual material;

a fixing portion, configured to contact with the substrate layer of the display panel to fix the display panel to the loading platform;

a pressing portion, disposed on a side of the loading platform to apply a pressing force to a part of the substrate layer adjacent to the residual material, the residual material being separated from the display panel under the action of the pressing force and freely falls off.

In an embodiment, the pressing portion includes:
a support;
a rotation shaft, disposed on a side of the support; and
a first pressing member, connected to the rotation shaft and rotatable relative to the support to apply a pressing force to a part of the substrate layer adjacent to the residual material.

In an embodiment, the support is in an L-shaped, an end of the support is disposed on the loading platform, and the rotation shaft is disposed on the other end of the support.

In an embodiment, the pressing portion includes a buffer layer disposed on a side of the pressing portion in contact with the substrate layer.

In an embodiment, the buffer layer is a rubber layer or a silica gel layer with a hardness lower than a hardness of the substrate layer;

the rubber layer or the silica gel layer with a Mohs hardness ranges from 50 to 60 and a thickness ranges from 0.5 mm to 1.5 mm In an embodiment, the pressing portion includes a buffer layer disposed on a side of the first pressing member in contact with the substrate layer.

In an embodiment, the buffer layer is a rubber layer or a silica gel layer with a hardness lower than a hardness of the substrate layer;

the rubber layer or the silica gel layer with a Mohs hardness ranges from 50 to 60 and a thickness ranges from 0.5 mm to 1.5 mm.

In an embodiment, an acute angle formed between the pressing portion and the substrate layer ranges from 15° to 75°.

In an embodiment, an acute angle formed between the first pressing member and the substrate layer ranges from 15° to 75°.

In an embodiment, an acute angle formed between the pressing portion and the substrate layer ranges from 30° to 45°.

In an embodiment, an acute angle formed between the first pressing member and the substrate layer ranges from 30° to 45°.

In an embodiment, a side of the first pressing member away from the rotation shaft is provided with a grippable handle.

In an embodiment, the residual material separation device further includes a first drive motor connected to the first pressing member to drive the first pressing member to rotate.

In an embodiment, the fixing portion includes:
a positioning member, disposed on a side of an upper surface of the loading platform away from the pressing portion and configured to contact with a side of the display panel away from the residual material to define a position of the display panel;
a fixing member, configured to contact with an upper surface of the substrate layer and apply a pressing force to the substrate layer to fix the display panel to the loading platform.

In an embodiment, the fixing portion further includes a second pressing member in contact with the fixing member to control the fixing member to move to apply a pressing force to the substrate layer via the fixing member.

In an embodiment, the residual material separation device further includes a second drive motor connected to the second pressing member to drive the second pressing member to move.

Another object of the present application is to provide a residual material separation device includes:
a loading platform, configured to support a display panel, the display panel including a substrate layer, a circuit layer, and residual material at a lateral side of the circuit layer, the loading platform is configured to contact with the circuit layer of the display panel and to avoid the residual material;

a fixing portion, configured to contact with the substrate layer of the display panel to fix the display panel to the loading platform;

a pressing portion, disposed on a side of the loading platform to apply a pressing force to a part of the substrate layer adjacent to the residual material, the residual material being separated from the display panel under the action of the pressing force and free fall off;

the pressing portion includes:

a support;

a rotation shaft, disposed on a side of the support;

a first pressing member, connected to the rotation shaft and rotatable relative to the support to apply a pressing force to a part of the substrate layer adjacent to the residual material; and an acute angle formed between the first pressing member and the substrate layer is 38°.

The residual material separation device provided by the embodiment of the present application improves the work efficiency, reduces the labor costs by mechanical substitution, and the structure is simple and is suitable for widespread use.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION OF THE DRAWINGS

Figure 1:
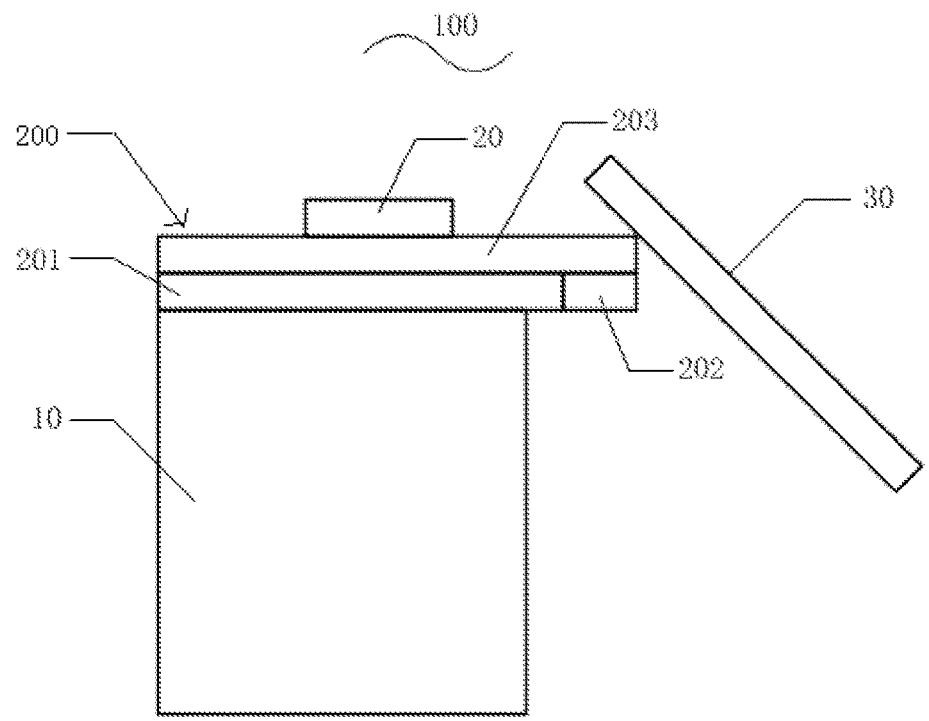
FIG. 1 is a structural block diagram of a residual material separation device according to an embodiment of the present application.

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed at" another component, it can be directly or indirectly on another component. When a component is referred to as being "connected to" another component, it can be directly or indirectly connected to another component. Directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. Terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In order to explain the technical solutions described in the present application, the following detailed description will be made in conjunction with the specific drawings and embodiments.

A residual material separation device 100 is provided by an embodiment of the present application, including a loading platform 10, a fixing portion 20, and a pressing portion 30.

The loading platform 10 is disposed to support the display panel 200. The display panel 200 includes a circuit layer 201, residual material 202 on the side of the circuit layer 201, and a substrate layer 203. The loading platform 10 is disposed to be in contract with the circuit layer 201 of the display panel 200 and to avoid the residual material 202.

In an application, the circuit layer 201 is an electronic circuit disposed on the substrate layer 203, the substrate layer 203 is a carrier for the circuit layer 201 to be disposed, and the substrate layer 203 is made of a photic material. The photic material can select any material suitable for the display panel 200 according to actual needs, for example, glass.

In an embodiment, the display panel 200 is a small-sized panel, and the display panel 200 can be a panel of a display device of any smaller size, such as a tablet, a laptop, a mobile phone, a personal digital assistant, a small-sized LCD TV, or the like.

In an application, the loading platform 10 may be a trapezoidal loading platform, a rectangular loading platform or a side-by-side arrangement of a plurality of discrete structures, and an upper surface of the loading platform 10 can be in surface contract with, in distributed line contact with (i.e., a plurality of line contact positions), or in distributed point contact with (i.e., a plurality of point contact positions) a lower surface (i.e., the lower surface of the circuit layer 201) of the display panel 200, thereby ensure that the display panel 200 is evenly placed on the loading platform 10.

In an application, the loading platform 10 is not in contact with the residual material 202 on the side of the circuit layer 201, that is, an end of the display panel 200 with residual material 202 is suspended such that the residual material 202 can be freely fallen off after being subjected by a pressing force.

As shown in FIG. 1, in the present embodiment, the loading platform 10 is exemplarily shown as a rectangular loading platform.

The fixing portion 20 is disposed to be in contact with the substrate layer 203 of the display panel 200 and is not in contact with a side of the substrate layer 203 adjacent to the residual material 202, and is configured to fix the display panel 200 to the loading platform 10.

In an application, the fixing portion 20 can fix the display panel 200 to the loading platform 10 in any no damage fixing manner, thereby the damage to the display panel 200 can be avoided. For example, the fixing portion 10 may include a fixing member 22 applying a pressing force to a surface of display panel 200 away from the loading platform 10 by its own gravity, and the fixing portion 10 may further include a positioning member 21 applying a pressing force to a side surface of the display panel 200.

In an application, the fixing portion 20 is not in contact with a side of the substrate layer 203 adjacent to the residual material, that is, the display panel 200 has no shelter above the residual material 202, which facilitates the pressing portion 30 applying a pressing force to a side of the substrate layer 20 adjacent to the residual material 202.

The pressing portion 30 is disposed on a side of the loading platform 10 adjacent to the residual material 202, and is configured to apply a pressing force to a side of the substrate layer 203 adjacent to the residual material 202, so that the residual material 202 subjected to the pressing force is separated from display panel 200 and freely falls off.

In an application, since the force transmission, the pressing force applied to a side of the substrate layer 203 adjacent to the residual material 202 can be transmitted to the residual material 202, so that the residual material 202 indirectly subjected to the pressing force can be separated from the display panel 200, and subjected to its own gravity acts freely to fall off.

In an application, since the contact portion between the residual material 202 and the circuit layer 201 is a cutting line, when the residual material 202 is subjected to a pressing force, the pressing force can be transmitted to the cutting line, causing the cutting line to be broken by stress, thereby and the residual material 202 is separated from the circuit layer 201 which can effectively protect the end portion of the circuit layer 201 such that the circuit layer 201 is not damaged.

In an application, in order to make the pressing force applied by the pressing portion 30 to the substrate layer 203 can be uniformly applied to the residual material 202 or the cutting line, the pressing portion 30 needs to be in line contact with, in surface contract with, in distributed line contact with, or in distributed point contact with a force-bearing position of the substrate layer 203 to realize evenly applying force and evenly bearing force. The pressing portion 30 may be any structure capable of being in line contact with, in surface contact with, in distributed line contact with, or in distributed point contact with a side of the substrate layer 203 adjacent to the residual material, as long as the substrate layer 203 is ensured that the upper surface of the side of the residual material 202 is evenly stressed.

As shown in FIG. 1, in the present embodiment, the pressing portion 30 is exemplarily shown to have a flat plate structure.

In an application, in order to facilitate the pressing portion 30 applying a pressing force to the substrate layer 203, there should be a certain angle between the pressing portion 30 and the substrate layer 203, when the pressing portion 30 is in contact with the substrate layer 203.

In an embodiment, when the pressing portion 30 is in contact with the substrate layer 203, the acute angle formed between the pressing portion 30 and the substrate layer 203 ranges from 15° to 75°.

In an embodiment, when the pressing portion 30 is in contact with the substrate layer 203, the acute angle formed between the pressing portion 30 and the substrate layer 203 ranges from 30° to 45°, and optional be 38°.

In an embodiment, the pressing portion 30 includes a buffer layer 331 disposed on a side of the pressing portion 30 in contact with the substrate layer 203, and the buffer layer 331 is disposed to make a pressing force applied by the pressing portion 30 gently apply to the substrate layer 203.

In a specific application, in order to avoid damage to the substrate layer 203 when the residual material 202 is separated, a buffer layer 331 made of a buffer material may be provided on a side of the pressing portion 30 in contact with the substrate layer 203, so that the pressing portion 30 can gently apply the pressing force to the substrate layer 203.

In an application, the buffer layer 331 may be made of any buffer material with a hardness lower than a hardness of the substrate layer 203, for example, a rubber layer made of a rubber material or a silica gel layer made of a silica gel material; in which the rubber layer or the silica gel layer with a Mohs hardness ranges from 50 to 60 and a thickness ranges from 0.5 mm to 1.5 mm.

In the embodiment of the present application, by applying a pressing force to the substrate layer 203 of the display panel 200 by using the pressing portion 30 instead of manually separating the residual material 202, so that the residual material located at a lateral side of the circuit layer 201 indirectly subjected to the pressing for cecan be separated from the display panel 200 and freely falls off, thereby the integrity of the end of the circuit layer 201 can be maintained and the worker's fingers can be effectively protected, the work efficiency is improved, the labor costs is reduced, and the structure is simple and is suitable for widespread use.

Figure 2:
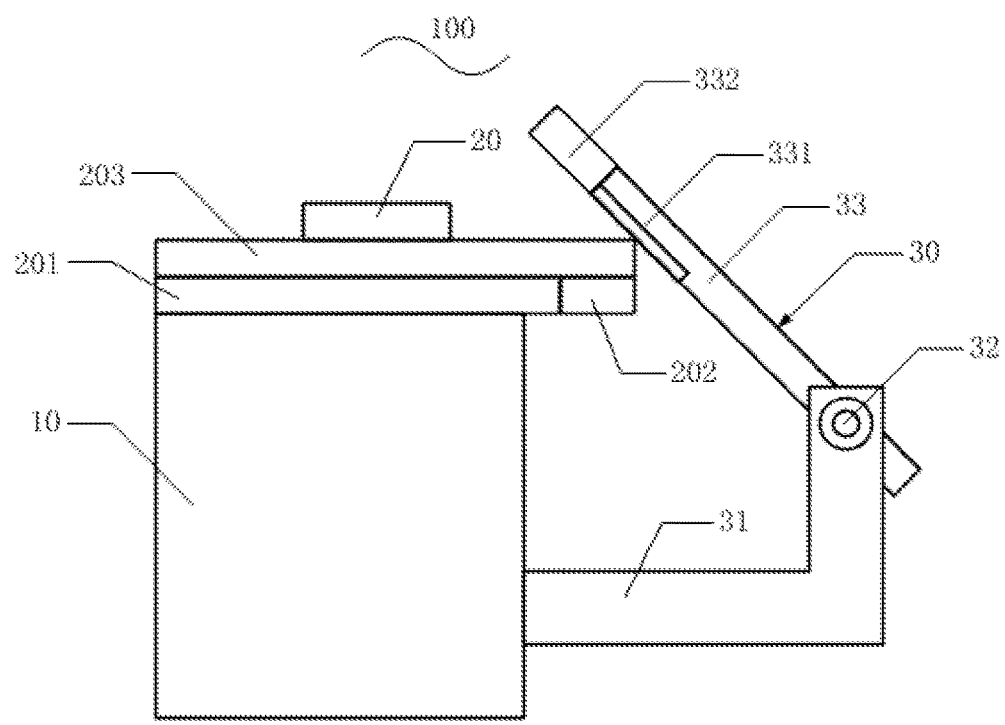
FIG. 2 is a structural block diagram of a residual material separation device provided by another embodiment of the present application.

As shown in FIG. 2, in an embodiment, the pressing portion 30 includes a support 31, a rotation shaft 32, and a first pressing member 33.

The support 31 is disposed on the ground or connected to the loading platform 10 and configured to support the first pressing member 33.

In an application, the support 31 can be any rigid structure capable of supporting.

As shown in FIG. 2, the support 31 is exemplarily shown as an L-shaped structure connected to the loading platform 10, that is, one end of the support 31 is disposed on the loading platform 10, and the rotation shaft 32 is disposed on the other end of the support 31.

The rotation shaft 32 is disposed on a side of the support 31.

In an application, the rotation shaft 32 is any bearing structure capable of rotating the first pressing member 33 around the support 31, which may be a fixed shaft or a movable shaft, and the fixed shaft is a bearing fixedly connected with the support 31 and configured to be not rotating relative to the support 31; the movable shaft is a bearing rotatably connected to the support 31 and configured to be rotating relative to the support 31.

As shown in FIG. 2, in the present embodiment, the rotation shaft 32 is exemplarily shown as a movable shaft rotatable relative to the support 31.

The first pressing member 33 is connected to the rotation shaft 32 and rotatable relative to the support 31 and configured to apply a pressing force to a side of the substrate layer 203 adjacent to the residual material 202.

In an application, the first pressing member 33 only needs to be rotatable relative to the support 31. When the rotation shaft 32 is fixed shaft, the first pressing member 33 is rotatable relative to the rotation shaft 32, and first pressing member 33 is provided with a bearing hole at an end thereof connected with the rotation shaft 32, the rotation shaft 32 is held in the bearing hole such that the first pressing member 33 can rotate relative to the rotation shaft 32; when the rotation shaft 32 is the movable shaft, the first pressing member 33 is rotatable or non-rotatable relative to the rotation shaft 32; when the first pressing member 33 is non-rotatable relative to the rotation shaft 32, the first pressing member 33 is fixedly connected with the rotation shaft 32.

In an application, the first pressing member 33 may be any structure capable of being in line contact with, in surface contact with, in distributed line contact with, or in distributed point contact with the substrate layer 203 adjacent to a side of the residual material 202, as long as ensured that an upper surface of a side of the substrate layer 201 adjacent to the residual material 202 is evenly stressed.

As shown in FIG. 2, in the present embodiment, the first pressing member 33 is exemplarily shown as a flat plate structure.

In an embodiment, when the pressing portion 30 is in contact with the substrate layer 203, an acute angle formed between the first pressing member 33 and the substrate layer 203 ranges from 15° to 75°.

In an embodiment, when the pressing portion 30 is in contact with the substrate layer 203, an acute angle formed between the first pressing member 33 and the substrate layer 203 ranges from 30° to 45°, and optionally be 38°.

In a specific application, in order to avoid damage to the substrate layer 203 when the residual material 202 is separated, a buffer layer 331 made of a buffer material can be disposed on a side of the first pressing member 33 in contact with the substrate layer 203 to enable the pressing member 33 can gently apply a pressing force to the substrate layer 203.

As shown in FIG. 2, in the present embodiment, the first pressing member 33 is exemplarily shown to include a buffer layer 331 disposed on a side of the first pressing member 33 in contact with the substrate layer 203 and configured to enable the first pressing member 33 can gently apply a pressing force to the substrate layer 203.

In an application, the buffer layer 331 may be any buffer material with a hardness lower than a hardness of the substrate layer 203, for example, one of rubber, silica gel, non-rubber material and non-silica material; in which, the silica gel with a Mohs hardness ranges from 50~60 and a thickness ranges from 0.5 mm~1.5 mm.

In an application, the pressing portion 30 can be manually operated or controlled by mechanical equipment.

As shown in FIG. 2, in the present embodiment, a grippable handle 332 is exemplarily shown on a side of the first pressing member 33 away from the rotation shaft 32.

In an application, the grippable handle 332 can be any structure that is easily grasped by a human hand, such as an ergonomically designed structure that conforms to the curve of the finger when the human hand maintains in the gripping motion.

As shown in FIG. 2, in the present embodiment, the grippable handle 332 is exemplarily shown as a cylindrical structure.

Figure 3:
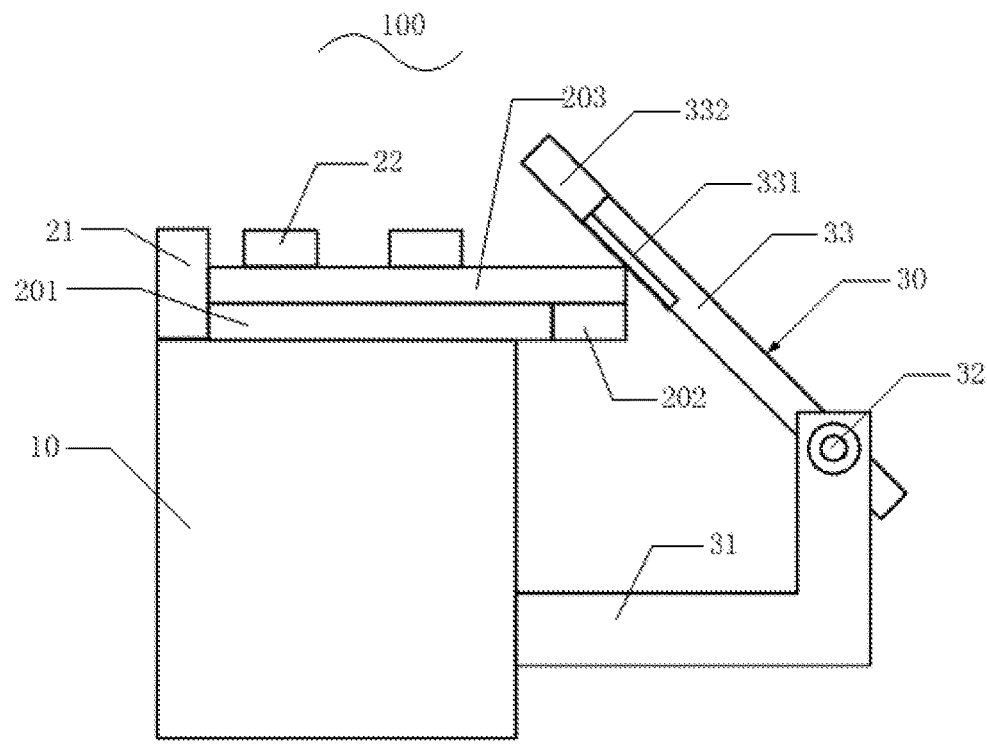
FIG. 3 is a structural block diagram of a residual material separation device according to further embodiment of the present application.

As shown in FIG. 3, in an embodiment, the fixing portion 20 includes a positioning member 21 and a fixing member 22.

The positioning member 21 is disposed on a side of the upper surface of the loading platform 10 away from the pressing portion 30 and configured to contact with a side of the display panel 200 away from the residual material 202 to define a position when the display panel 200 is disposed on the loading platform 10.

In an application, the positioning member 21 can be any structure that can function to limit or position the display panel 200 without causing mechanical damage to the display panel 200, for example, a positioning block, positioning pin, etc.

As shown in FIG. 3, in the present embodiment, the positioning member 21 is exemplarily shown as a positioning block.

The fixing member 22 is disposed in contact with the upper surface of the substrate layer 203 and configured to apply a pressing force to the substrate layer 203 to fix the display panel 200 to the loading platform 10.

In an application, the number of the fixing members 22 can be arranged according to actual needs, and the fixing member 22 can be in contract with the substrate layer in any manner that does not mechanically damage the substrate layer, such as in point contract with, in surface contract with, in distributed point contract with, or in distributed line contact with the upper surface of the substrate layer 203, and applying a pressing force to the substrate layer 203 to fix the display panel 200 to the loading platform 10.

As shown in FIG. 3, in the present embodiment, two rectangular fixing members 22 which apply a pressing force to the substrate layer 203 by their own gravity are exemplarily shown.

Figure 4:
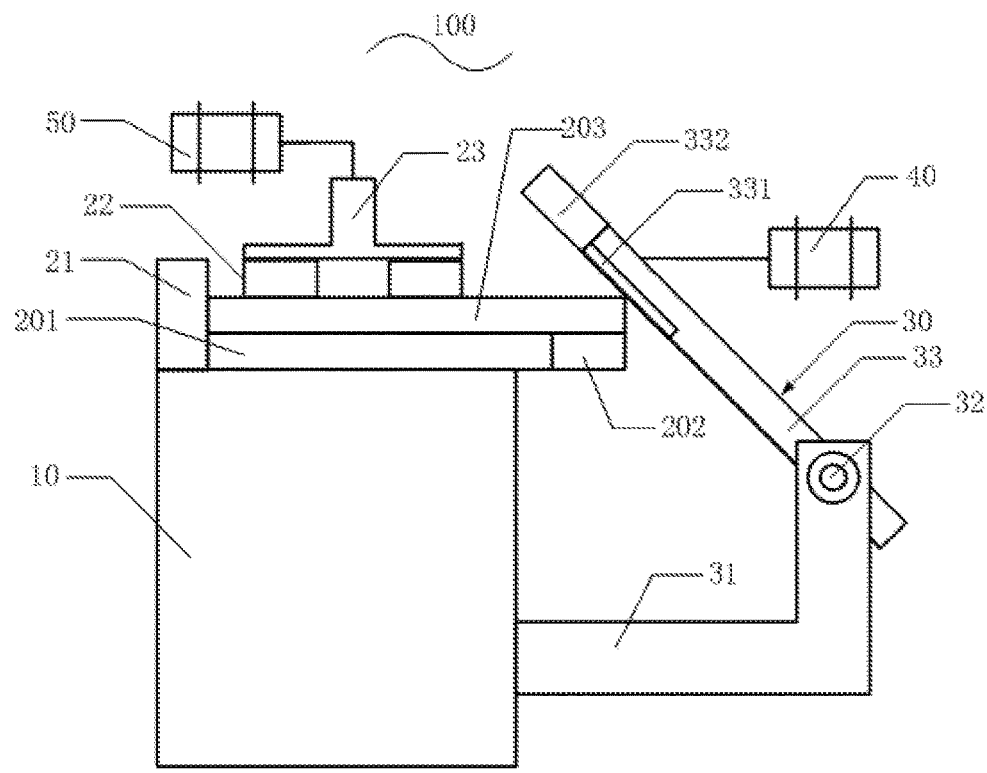
FIG. 4 is a structural block diagram of a residual material separation device provided by further embodiment of the present application.

As shown in FIG. 4, in an embodiment, the fixing portion 20 further includes a second pressing member 23 in contact with the fixing member 22 and configured to control the fixing member 22 to move, thereby when the fixing member 22 is in contract with the substrate layer 203 applying a pressing force to the substrate layer 203 by the fixing member 22.

In an application, the second pressing member 23 can be any member that can control the fixing member 22 to move up and down and apply a pressing force to the fixing member 22, for example, a vacuum chuck, a mechanical link, a robot arm or other transmission mechanism having a corresponding function.

As shown in FIG. 4, in the present embodiment, the second pressing member 23 is exemplarily shown as a vacuum chuck.

As shown in FIG. 4, in the present embodiment, the residual material separation device 100 further includes a first drive motor 40 and a second drive motor 50.

The first drive motor 40 is connected to the first pressing member 33 and configured to drive the first pressing member 33 to rotate such that the first pressing member 33 can be controlled by mechanical equipment.

In an application, the residual material separation device can include both the grippable handle 332 and the first drive motor 40 or only one of them, when the residual material separation device includes the grippable handle 332 and the first drive motor 40, the robustness of the residual material separation device can be improved such that when either of the grippable handle 332 or the first drive motor 40 is unable to use, it can be replaced by another member.

The second drive motor 50 is connected to the second pressing member 23 and configured to drive the second pressing member 23 to move.

In an application, the first drive motor 40 and the second drive motor 50 can select as a servo motor to achieve precise control of the first pressing member 33 and the second pressing member 23.

In an embodiment, the residual material separation device further includes a control portion connected to the first drive motor 40 and the second drive motor 50, and the control portion can be realized by a general-purpose integrated circuit, such as a central processing unit (CPU), or an application specific integrated circuit (ASIC).

The aforementioned embodiments are only optional embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A residual material separation device, comprising:
   a loading platform, configured to support a display panel, wherein the display panel includes a substrate layer, a circuit layer, and a residual material at a lateral side of the circuit layer, the loading platform is configured to contact with the circuit layer of the display panel and to avoid the residual material;
   a fixing portion, configured to contact with the substrate layer of the display panel to fix the display panel to the loading platform;
   a pressing portion, disposed adjacent to a side of the loading platform to apply a pressing force to a part of the substrate layer adjacent to the residual material, wherein the residual material is separated from the display panel under the action of the pressing force and freely falls off;
   wherein the pressing portion comprises a buffer layer disposed on a side of the pressing portion that is in contact with the substrate layer, and wherein the buffer layer is arranged on and integrated with the pressing portion;
   wherein the fixing portion comprises:
   a limiting block, disposed on an upper surface of the loading platform on a side away from the pressing portion and configured to contact with a side of the display panel away from the residual material to limit a position of the display panel so that when the pressing portion is pressing against the substrate the layer the limiting block is operative to prevent the display panel from sliding relative to the loading platform thus securing the display panel in place;
   a fixing block, configured to contact with an upper surface of the substrate layer on a side away from the residual material, and apply a pressing force to the substrate layer to fix the display panel to the loading platform.

2. The residual material separation device of claim 1, wherein the pressing portion comprises:
   a support;
   a rotation shaft, disposed on a side of the support; and
   a first pressing plate, connected to the rotation shaft and rotatable relative to the support to apply a pressing force to a part of the substrate layer adjacent to the residual material.

3. The residual material separation device of claim 2, wherein the support is L-shaped, an end of the support is disposed on the loading platform, and the rotation shaft is disposed on the other end of the support.

4. The residual material separation device of claim 2, wherein an acute angle formed between the first pressing plate and the substrate layer ranges from 15° to 75°.

5. The residual material separation device of claim 2, wherein a side of the first pressing plate away from the rotation shaft is provided with a grippable handle.

6. The residual material separation device of claim 5, further comprising a first drive motor connected to the first pressing plate to drive the first pressing plate to rotate, and a grippable handle fixedly connected to an end of the first pressing plate away from the rotation shaft, wherein the grippable handle is used to be manually operated by a user in cases where the first drive motor fails.

7. The residual material separation device of claim 5, wherein the grippable handle is an ergonomically designed structure that is congruity with a curve of the fingers of a human hand when the human hand is performing a gripping motion.

8. The residual material separation device of claim 2, wherein the residual material separation device further comprises a first drive motor connected to the first pressing plate to drive the first pressing plate to rotate.

9. The residual material separation device of claim 2, wherein the rotation shaft is a fixed shaft, and the first pressing plate is rotatable relative to the rotation shaft; wherein the first pressing plate comprises a bearing hole at each of both ends connected to the rotation shaft, and both ends of the rotation shaft are held in the bearing holes enabling the first pressing plate to rotate relative to the rotation shaft.

10. The residual material separation device of claim 2, wherein the first pressing plate is rotatable or non-rotatable relative to the rotation shaft.

11. The residual material separation device of claim 10, wherein when the first pressing plate is non-rotatable relative to the rotation shaft, the first pressing plate is fixedly connected with the rotation shaft.

12. The residual material separation device of claim 1, wherein the buffer layer is a rubber layer or a silicone layer with a hardness lower than a hardness of the substrate layer; and
   wherein the rubber layer or the silicone layer has a Mohs hardness that ranges from 50 to 60 and a thickness that ranges from 0.5 mm to 1.5 mm.

13. The residual material separation device of claim 1, wherein an acute angle formed between the pressing portion and the substrate layer ranges from 15° to 75°.

14. The residual material separation device of claim 1, wherein the fixing portion further comprises a second pressing block in contact with the fixing block to control the fixing block to move to apply a pressing force to the substrate layer via the fixing block.

15. The residual material separation device of claim 14, wherein the residual material separation device further comprises a second drive motor connected to the second pressing block to drive the second pressing block to move.

16. The residual material separation device of claim 1, wherein the loading platform is a side-by-side arrangement of a plurality of discrete structures.

17. A residual material separation device, comprising:
   a loading platform, configured to support a display panel, wherein the display panel includes a substrate layer, a circuit layer, and a residual material at a lateral side of the circuit layer, the loading platform is configured to contact with the circuit layer of the display panel and to avoid the residual material;
   a fixing portion, configured to contact with the substrate layer of the display panel to fix the display panel to the loading platform;
   a pressing portion, disposed on a side of the loading platform to apply a pressing force to a part of the substrate layer adjacent to the residual material, wherein the residual material is separated from the display panel under the action of the pressing force and freely falls off;
wherein the pressing portion comprises:
a support;
a rotation shaft, disposed on a side of the support; and
a first pressing plate, connected to the rotation shaft and rotatable relative to the support to apply a pressing force to a part of the substrate layer adjacent to the residual material; and
wherein an acute angle formed between the first pressing plate and the substrate layer is 38°;
wherein the pressing portion comprises a buffer layer that is disposed on a side of the pressing portion in contact with the substrate layer, and wherein the buffer layer is arranged on and integrated with the pressing portion;
wherein the fixing portion comprises:
a limiting block, disposed on an upper surface of the loading platform on a side away from the pressing portion and configured to contact with a side of the display panel away from the residual material to limit a position of the display panel so that when the pressing portion is pressing against the substrate the layer the limiting block is operative to prevent the display panel from sliding relative to the loading platform thus securing the display panel in place;
a fixing block, configured to contact with an upper surface of the substrate layer on a side away from the residual material, and apply a pressing force to the substrate layer to fix the display panel to the loading platform.

* * * * *